United States Patent
Johnson

(10) Patent No.: US 11,831,662 B1
(45) Date of Patent: *Nov. 28, 2023

(54) SYSTEMS AND METHODS FOR DETECTING AND MITIGATING CYBER ATTACKS ON POWER SYSTEMS COMPRISING DISTRIBUTED ENERGY RESOURCES

(71) Applicant: National Technology & Engineering Solutions of Sandia, LLC, Albuquerque, NM (US)

(72) Inventor: Jay Tillay Johnson, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/837,596

(22) Filed: Jun. 10, 2022

Related U.S. Application Data

(63) Continuation of application No. 16/689,838, filed on Nov. 20, 2019, now Pat. No. 11,388,178.

(Continued)

(51) Int. Cl.
*H04L 29/06* (2006.01)
*H04L 9/40* (2022.01)
(Continued)

(52) U.S. Cl.
CPC ...... *H04L 63/1416* (2013.01); *G06F 11/0793* (2013.01); *H02J 3/14* (2013.01);
(Continued)

(58) Field of Classification Search
CPC ............ H04L 63/1416; H04L 63/0218; H04L 63/1425; G06F 11/0793; H02J 3/14; H02J 3/003
See application file for complete search history.

(56) References Cited

U.S. PATENT DOCUMENTS 10,205,733 B1 * 2/2019 Park .................. H04L 63/18
10,860,305 B1 12/2020 Harland et al.
(Continued)

OTHER PUBLICATIONS

Chavez, A. et al., "Hybrid Intrusion Detection System Design for Distributed Energy Resource Systems," IEEE CyberPELS Workshop 2019, Knoxville, TN, Apr. 29-May 1, 2019, 6 pages.
(Continued)

*Primary Examiner* — Ka Shan Choy
(74) *Attorney, Agent, or Firm* — Daniel J. Jenkins

(57) ABSTRACT

Extensive deployment of interoperable distributed energy resources (DER) on power systems is increasing the power system cybersecurity attack surface. National and jurisdictional interconnection standards require DER to include a range of autonomous and commanded grid-support functions which can drastically influence power quality, voltage, and the generation-load balance. Investigations of the impact to the power system in scenarios where communications and operations of DER are controlled by an adversary show that each grid-support function exposes the power system to distinct types and magnitudes of risk. The invention provides methods for minimizing the risks to distribution and transmission systems using an engineered control system which detects and mitigates unsafe control commands.

10 Claims, 5 Drawing Sheets

Related U.S. Application Data

(60) Provisional application No. 62/769,771, filed on Nov. 20, 2018.

(51) Int. Cl.
  *G06F 11/07* (2006.01)
  *H02J 3/14* (2006.01)
  *H02J 3/00* (2006.01)

(52) U.S. Cl.
  CPC ...... *H04L 63/0218* (2013.01); *H04L 63/1425* (2013.01); *H02J 3/003* (2020.01)

(56) References Cited

U.S. PATENT DOCUMENTS

| | | | |
|---|---|---|---|
| 2013/0198847 A1 | 8/2013 | Sampigethaya | |
| 2017/0093889 A1* | 3/2017 | McEachern | H04L 63/1416 |
| 2017/0163029 A1* | 6/2017 | Hong | H02H 7/262 |
| 2017/0229868 A1 | 8/2017 | Laval et al. | |
| 2018/0284748 A1 | 10/2018 | Korsedal, IV et al. | |
| 2018/0330250 A1 | 11/2018 | Nakayama et al. | |
| 2018/0337932 A1* | 11/2018 | Juster | G06F 21/35 |
| 2019/0116245 A1* | 4/2019 | Hong | H04L 69/08 |
| 2019/0121571 A1* | 4/2019 | Wahla | G06F 3/0679 |
| 2019/0362070 A1* | 11/2019 | Abbaszadeh | G06F 21/554 |

OTHER PUBLICATIONS

Johnson, J. et al., "Power system effects and mitigation recommendations for DER cyberattacks," IET Cyber-Physical Systems: Theory & Applications, Jan. 2019, DOI: 10.1049/iet-cps.2018.5014, 10 pages.

Johnson, J., "Roadmap for Photovoltaic Cyber Security," Sandia National Laboratories report, SAND2017-13262, Dec. 2017, 67 pages.

* cited by examiner

US 11,831,662 B1

SYSTEMS AND METHODS FOR DETECTING AND MITIGATING CYBER ATTACKS ON POWER SYSTEMS COMPRISING DISTRIBUTED ENERGY RESOURCES

CROSS-REFERENCE TO RELATED APPLICATIONS

This application is a continuation of U.S. patent application Ser. No. 16/689,838, entitled "Systems and Methods for Detecting and Mitigating Cyber Attacks on Power Systems Comprising Distributed Energy Resources," filed Nov. 20, 2019, which claims priority to U.S. Provisional Patent Application No. 62/769,771, entitled "Methods for Mitigating Cyber Attacks on Power Systems Comprising Distributed Energy Resources," filed Nov. 20, 2018, both of which are herein incorporated by reference in their entireties.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to the security of power systems and, in particular, to systems and methods to mitigate cyber-attacks on power systems comprising distributed energy resources.

BACKGROUND OF THE INVENTION

Cyber-secure, resilient energy is paramount to the prosperity of the United States and other countries around the world. Traditionally, power systems have operated with dedicated communication channels to large generators and utility-owned assets, but today there is greater reliance on distributed energy resources (DER) to provide power generation. The interconnection of power electronics-interfaced DERs, like photovoltaic (PV) inverters and energy storage systems (ESSs), has been increasing worldwide for the last two decades due to renewable portfolio standards, environmental standards, and customer preference.

PV inverters and other DERs often communicate with utilities, aggregators, and other grid operators over the public internet, expanding the possibilities for attacks to power systems. These systems have traditionally been designed to not participate with grid operations and to disconnect from the grid when there are voltage or frequency disturbances, per the U.S. interconnection standard, IEEE 1547. However, DERs are equipped with a range of grid-support functions that if controlled or programmed improperly present a risk of power system disturbances. In particular, renewable energy penetrations have reached a point where challenges with voltage regulation, protection, and bulk system control are becoming an issue because DERs are displacing thermal plants with inertia-less, non-dispatchable, variable sources of generation.

To mitigate these challenges, utilities, independent system operators (ISOs), distribution system operators (DSOs), and transmission system operators (TSOs) are pushing for updated DER interconnection standards which include DER grid-support functions. For instance, the California Public Utilities Commission (CPUC) updated Electric Rule 21 in early 2015 to include seven autonomous grid-support functions and Hawaii Rule 14 was updated to include new grid-support functionality for DER. Similar changes to interconnection standards and grid codes have been occurring in Italy, Germany, Austria, Australia and New Zealand, and other places around the world. In the majority of these regions, grid-support functions are programmed before installation and operate with fixed settings for their lifetimes. However, the 2018 revision of IEEE 1547 requires DER devices to include communications interfaces that provide grid operators, DER vendors, and aggregators the ability to adjust the DER operating modes and setpoints.

Interoperability allows commanded functions to be employed and autonomous function parameters to be changed. However, the cyber security risk to the power system increases significantly when extending communications to DER devices because the utility supervisory control and data acquisition (SCADA) controls are now issued over public internet channels as opposed to using the traditional dedicated telecommunications lines. Some larger DER plant controllers connect to grid operators through fiber-optic cables, copper telephone lines, cellular modems, and microwave or other radio relays, so there are several access points to these systems. Smaller DER systems typically use wired or wireless connections using WiFi, cellular, zigbee, ethernet or serial communications to the equipment.

Residential and commercial DER manufacturers typically add a local IEEE 1815 (DNP3) or IEEE 2030.5 gateway device which translates those external protocols to Modbus or power line carrier (PLC) that change the local power electronics operations. The associated Modbus maps are often proprietary but more recently there has been heavier adoption of SunSpec Alliance de facto standard information models. See SunSpec Alliance, SunSpec Specifications & Information Models, accessed 10-19-2017, URL: https://sunspec.org/about-sunspec-specifications/. The Modbus and PLC protocols do not include confidentiality (e.g., native encryption), authentication, or authorization capabilities natively. For this reason, it is difficult to ensure data integrity between aggregators or utilities and the DERs.

Grid-support functions, like those shown in FIG. 1 for voltage, frequency, and grid protection, are principally designed to assist grid operators with large frequency and voltage variations. See M. Morjaria and D. Anichkov, "Grid-Friendly' Utility-Scale PV Plants," First Solar white paper, 13 Aug. 2013. To prevent interactions of the inverters with voltage regulation equipment and avoid interactions with automatic generation control (AGC) and regulation generators, autonomous functions are designed with dead-bands around nominal voltage and frequency. Additionally, the response time and ramp rate of many of the functions can be programmed to prevent adverse interactions with the existing power system controls. If these parameters are misconfigured or changed maliciously, the orchestrated control interactions of power system regulation equipment may conflict.

Distribution Cases

Reactive Power Control

One of these most common distribution voltage regulation functions is the "volt-var," voltage-reactive power or "W" function, which adjusts the DER reactive power based on grid voltage. When properly designed, the DER will absorb reactive power at high voltages, and produce (or inject) reactive power into the power system at low voltages. This reactive power compensation has been studied extensively and is required in European and American interconnection standards. See J. W. Smith et al., "Smart inverter volt/var control functions for high penetration of PV on distribution systems," IEEE/PES PSCE, Phoenix, Ariz., 2011, pp. 1-6, 2011; F. Ding et al., Photovoltaic Impact Assessment of Smart Inverter Volt-VAR Control on Distribution System Conservation Voltage Reduction and Power Quality, NREL Report, NREL/TP-5D00-67296, December 2016.

Multiple distribution system simulations of a rural 12 kV distribution feeder serving a highly commercial load area (see Quirez et al. "Communication requirements for hierarchical control of volt-var function for steady-state voltage," IEEE PES ISGT, Washington, D.C., pp. 1-5, 2017" for feeder details) were conducted for the controlled VV function and compared to feeder voltages when the VV parameters were maliciously changed due to cyber-attack. In one attack, the VV curve parameters of the default VV curve were flipped about the zero-reactive power line, as shown by the short-dashed inverted VV curve in FIG. 2. This caused the inverter to drive the feeder away from nominal voltage by producing reactive power at high voltage and absorbing reactive power at low voltage. See details in J. Johnson et al., "Power System Effects and Mitigation Recommendations for DER Cyber Attacks," IET Cyber-Physical Systems: Theory & Applications, January 2019. The second example considered an attack which changed the VV curve so the DER always produced 42% of the reactive power nameplate, as shown by the long-dashed Var curve in FIG. 2. The resulting inverter behavior resulted in the reactive power production always driving a voltage increase on the distribution circuit. This impact is similar to those studied by Ju and Lin, and Chavez. See Peizhong Ju and Xiaojun Lin, Adversarial Attacks to Distributed Voltage Control in Power Distribution Networks with DERs. In Proceedings of the Ninth International Conference on Future Energy Systems (e-Energy '18). ACM, New York, N.Y., USA, 291-302 (2018). DOI: https://doi.org/10.1145/3208903.3208912] and A. Chavez, et al., "Hybrid Intrusion Detection System Design for Distributed Energy Resource Systems," IEEE CyberPELS Workshop 2019, Knoxville, Tenn., April 29-May 1, 2019.

Similar power system voltage deviations have been shown for power factor (PF) and other reactive power control functions. Like the volt-var function, if the adversary controls the DER PF settings, feeder voltages could be increased significantly beyond ANSI limits. See details in J. Johnson et al., "Power System Effects and Mitigation Recommendations for DER Cyber Attacks," IET Cyber-Physical Systems: Theory & Applications, January 2019.

Over-voltages of the magnitude demonstrated from both the VV and constant reactive power (constant volt-amp reactive (VAr)) attacks would result in DER tripping or possible equipment damage. The impact is shown in FIG. 3 on the distribution system and the peak feeder voltage over the course of 1 week is shown in FIG. 4. Generally, equipment is protected from voltage excursions by voltage stabilizers, but some products like air conditioners, refrigerators, or computer equipment could be damaged by voltage deviations. Standards for voltage limits are described in ANSI C84.1 for steady-state utility service voltages, in Information Technology Industrial Council (ITIC) for transient voltage requirements for computers, SEMI F47 for the semiconductor industry, or IEEE Std 1668-2017 for general equipment. See Pacific Gas and Electric Company, Voltage Tolerance Boundary, January 1999; and IEEE Std 1668, "IEEE Recommended Practice for Voltage Sag and Short Interruption Ride-Through Testing for End-Use Electrical Equipment Rated Less than 1000 V," 2017.

In cases of high penetrations of PV power production, this could cause grave system impacts; when the inverters trip from high or low voltage events, the loss of this generation and reactive power contribution could exacerbate the voltage deviation or, from a transmission perspective, threaten grid stability if enough of the DER separated from the electric power system, as discussed in the transmission case.

Transmission Cases

DER devices that interface with the larger grid through power electronics show promise in improving grid functions because of their ability to adjust output nearly instantaneously. Contrary to traditional rotating mass generation, these inertia-less sources must respond to disturbances through intelligent control based on measured or communicated signals rather than physical means like electromechanical coupling. As a result, these devices exhibit vulnerabilities to adversaries primarily through parameter adjustment or remote signal manipulation.

Frequency Droop

DER are increasingly responsive to frequency fluctuations and can participate in the primary frequency regulation of the system. See J. Neely et al., Evaluation of PV Frequency-Watt Function for Fast Frequency Reserves, IEEE APEC, Long Beach, Calif., Mar. 20-24, 2016; and A. Hoke et al., The Frequency-Watt Function: Simulation and Testing for the Hawaiian Electric Companies, GMLC Technical Report, July 2017. Typically, the control mechanism used to provide this type of regulation is a proportional control action similar to the governor droop found in conventional generation. See P. Kundur, Power System Stability and Control, McGraw-Hill, 1994. This type of control is also known as the frequency-watt function when the function is linear. Traditionally, the signal the DER control and respond to is a local measurement of frequency on the bus they are interconnected. Previous research has shown that using a global (or average) system frequency instead of a local one is beneficial to the regulation provided by DER. See F. Wilches-Bernal et al., "Impact of Communication Latencies and Availability on Droop-Implemented Primary Frequency Regulation" 49th NAPS, Morgantown, W. Va., September 2017.

The effects on the initial frequency response of the system when the control action provided by DER is corrupted by a malicious attack is described below. The scenario considered is when the control action is inverted, which means that DER will decrease their power output when the frequency drops, exacerbating the initial power imbalance. This action is achieved by using a negative droop gain (or inverting the frequency-watt function). FIGS. 5(a) and 5(b) show the frequency response of the system for the loss of generation event described above when the proportional gain of the DER included in the system has different negative values ranging from −1 to −40. FIG. 5(a) shows the results when the feedback signal to the droop control of the DER is the local bus frequency. These results show that the decrease in system frequency is exacerbated by the DER action, as anticipated. With negative values of droop gain of −25 and beyond, the system loses synchronism which is observed in FIG. 5(a) as the average frequency becomes underdamped. Note the time it takes the system to go unstable decreases as the negative gain increases. FIG. 5(b) shows the results for the case when the feedback signal of the DER is an average signal of the system. These results show the same behavior as those in FIG. 5(a) with the system losing synchronism for gains of −25 and below.

DER can also participate in the primary frequency regulation of the system using a feedforward control strategy named Communication-Enabled Fast-Acting Imbalance Reserve (CE-FAIR) using the curtailment function. See F. Wilches-Bernal et al., "Communication Enabled Fast Acting Imbalance Reserve (CE-FAIR)," IEEE Transactions on Power Systems vol. 33, no. 1, pp. 1101-1103, January 2018. In this approach, DER are controlled with an order that is constructed based on power imbalances. Once a significant power imbalance has been detected, DER in the system are re-dispatched to reduce the power imbalance and its effect on the frequency of the system. In CE-FAIR, the amount of the power imbalance to be provided by DER is determined by a parameter, η, known as the power compensation level. An η value of 1 means all the power imbalance is compensated by the DER action commanded by CE-FAIR. The redispatch and identification of power imbalances in this method occurs through communication networks and hence are vulnerable to attacks. If the power imbalance is misidentified or the command order to the DER is reverted, the CE-FAIR action may act to further increase, rather than reduce, the power imbalance.

ISO-NE references NERC Reliability Standard PRC-006-NPCC "Automatic Underfrequency Load Shedding" as its operating procedure, which states that Distribution Providers and Transmission Owners in the Eastern Interconnection must implement their first stage of underfrequency load shedding (UFLS) at 59.5 Hz. See F. Wilches-Bernal et al., "Communication Enabled Fast Acting Imbalance Reserve (CE-FAIR)," IEEE Transactions on Power Systems vol. 33, no. 1, pp. 1101-1103, January 2018; and NERC, PRC-006-NPCC-1 "Automatic Underfrequency Load Shedding," 9 Feb. 2012. Therefore, the manipulation of the CE-FAIR controller would not cause a loss of load, unlike the unstable cases for CE-SI and frequency-droop (i.e., FW). However, balancing regions with less inertia or greater penetrations of inverter-based DER, like Hawaiian grids, could experience load shedding in these scenarios. See F. Wilches-Bernal et al., "Communication Enabled Fast Acting Imbalance Reserve (CE-FAIR)," IEEE Transactions on Power Systems vol. 33, no. 1, pp. 1101-1103, January 2018; and NERC, PRC-006-NPCC-1 "Automatic Underfrequency Load Shedding," 9 Feb. 2012.

SUMMARY OF THE INVENTION

A method for mitigating a cyber attack on a power system that includes distributed energy resources (DER) and a DER communication system is disclosed that includes detecting and mitigating unsafe commands in the DER communication system with an intrusion detection system (IDS) or intrusion prevention system (IPS) by providing an engineered control system that prevents the DER from operating in a mode known to be unsafe or destabilizing to the power system based on analyzing one or commands to the DER within a predetermined set of rules for one or more grid support functions that could initiate an unsafe or destabilizing condition and determining if the one or more commands are safe or unsafe.

A detection and mitigation system for a distributed energy system comprising distributed energy resources (DER) is disclosed that includes an engineered control system located at communication network nodes between DER and a DER management system (DERMS) or power system controller. The engineered control system is configured to detect and reject an unsafe grid-support function command for the DER that falls out of a predetermined allowable range.

BRIEF DESCRIPTION OF THE DRAWINGS

The disclosure refers to the following drawings, wherein like elements are referred to by like numbers.

DETAILED DESCRIPTION OF THE INVENTION

The present disclosure is directed to systems and methods for reducing the impact of attacks on power distribution grids that include distributed energy resources (DERs) by detecting, negating and/or mitigating security risks created by communication-enabled distribution and transmission DER control functions. For example, improper programming or malicious adjustment of grid-support functions for DER can lead to (a) voltage excursions above grid code standards which can lead to equipment damage, and (b) instabilities in the bulk power system that can lead to load shedding or blackout. According to an embodiment of the invention, one or more engineered control systems in DER, utility, aggregator, and/or networking firmware or software can be used to prevent a DER, and therefore the power system, from operating in unsafe modes.

Based on the findings in distribution and transmission cases described, systems and methods are disclosed that predict the influence of adversary control of DER networks for different grid support functions and defend against those types of attacks. The anticipated effects of malicious control over DER advanced grid-support functions are described below. According to another embodiment of the disclosure, systems and methods are disclosed that include defense-in-depth security that minimizes the power system impact of this malicious control. The first embodiment comprises a set of device-level, pre-programmed firmware or software process rules designed to prevent DER from entering unsafe operating regions. The second embodiment includes a DER control network architecture that minimizes the power system impact from common-mode attacks by isolating the extent of the attack. These two defensive mechanisms can be implemented in additional to other standardized cybersecurity principles of keeping DER equipment available, ensuring the integrity of the data packages, and keeping data-in-transit confidential through access controls and encryption.

Figure 1:
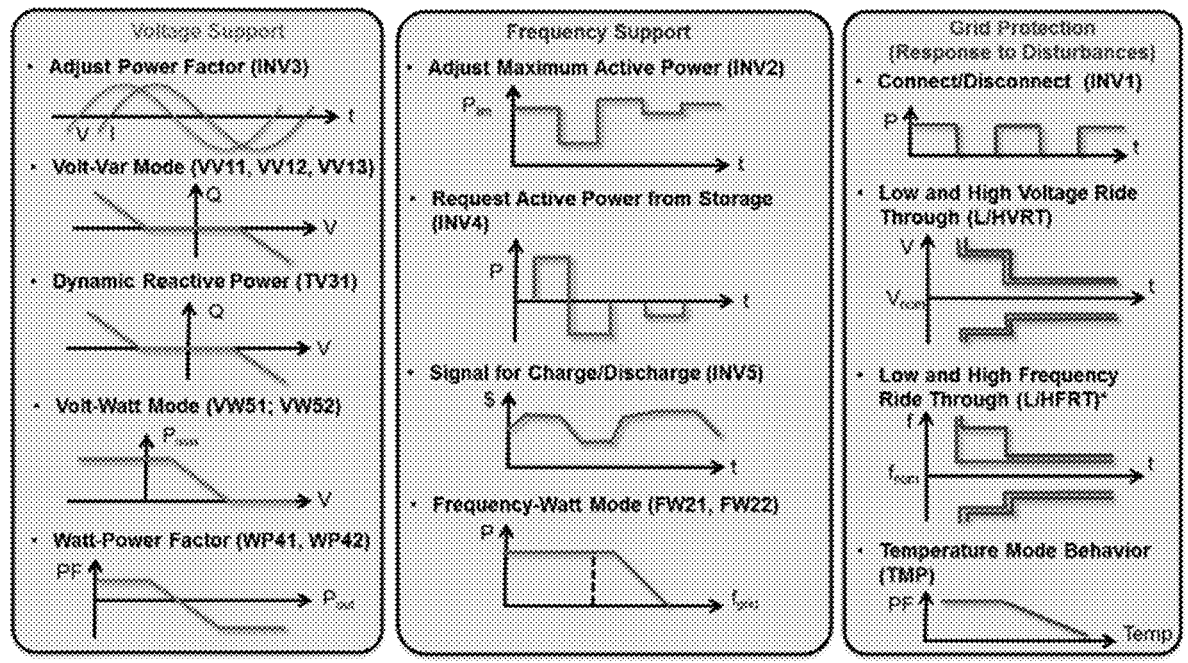
FIG. 1 is an illustration of IEC 61850-90-7 grid-support functions. *L/HFRT was not originally included in the IEC report, but is a common function in interconnection standards.
Figure 2:
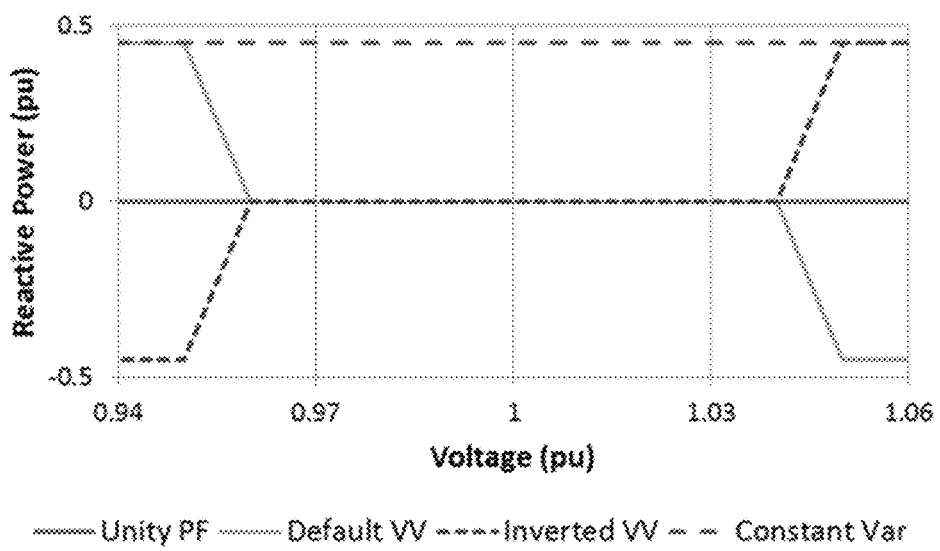
FIG. 2 is a graph showing volt-var plane comparisons for cases simulated.
Figure 3:
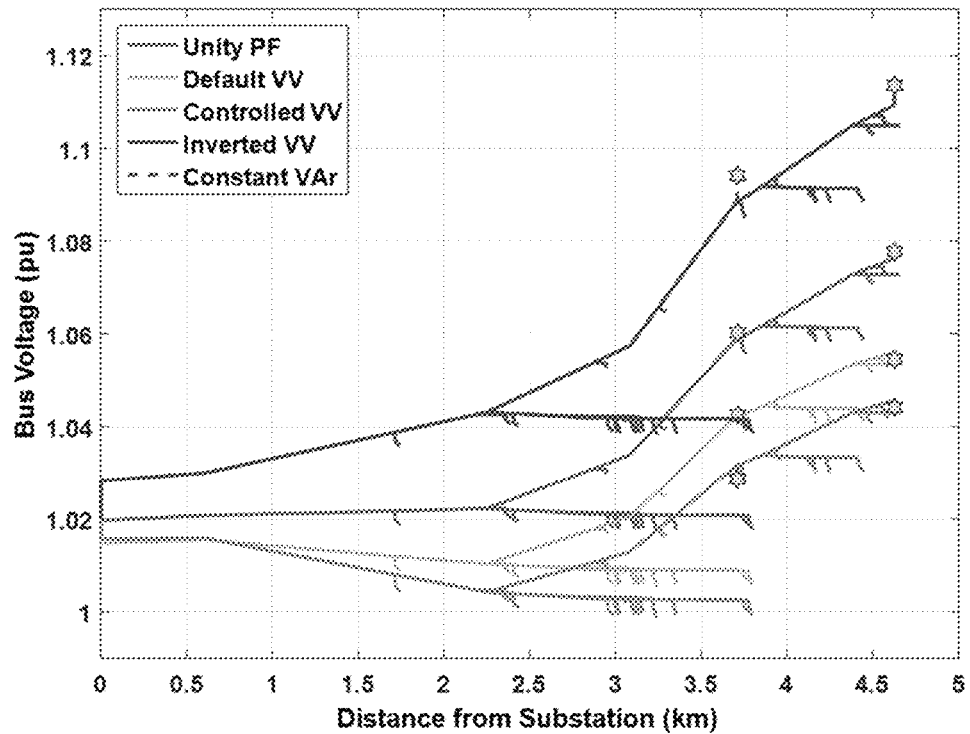
FIG. 3 is a graph showing feeder voltage profile for different reactive power control modes.
Figure 4:
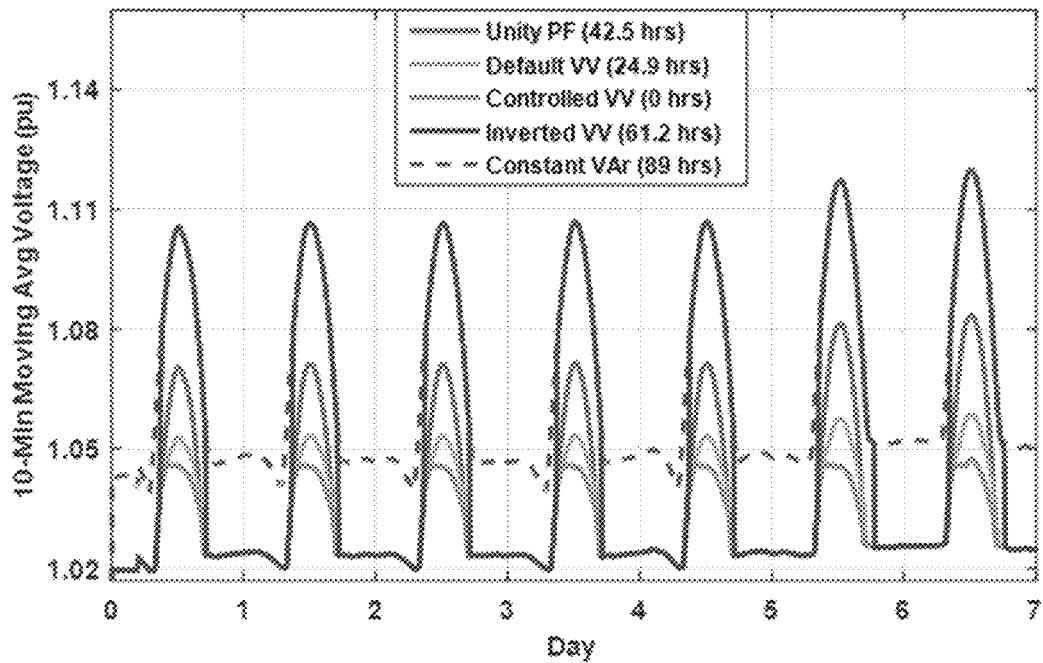
FIG. 4 is a graph showing maximum voltages for VV/SS-voltage distribution system control case with attack case results.
Figure 5A:
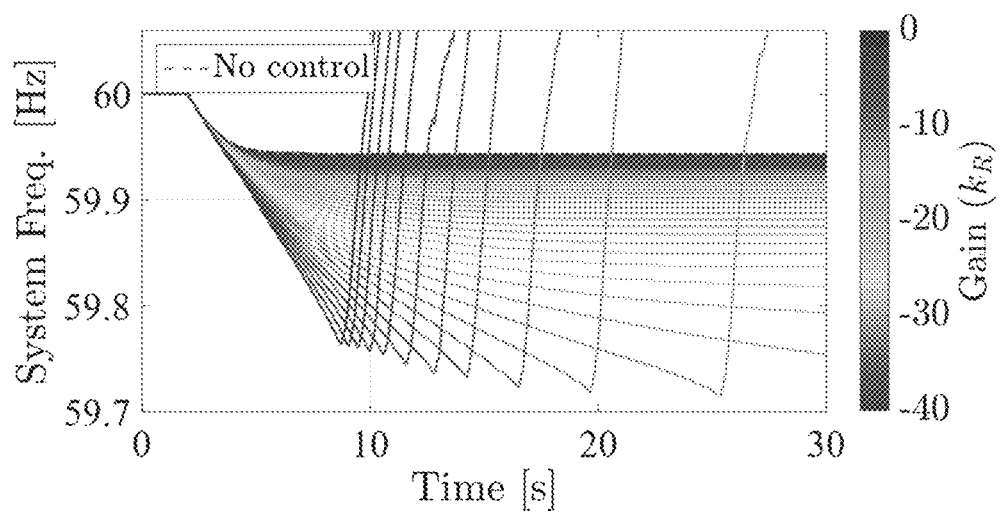
FIG. 5(a) is a graph showing system frequency response for the loss of generation event with conventional droop.
Figure 5B:
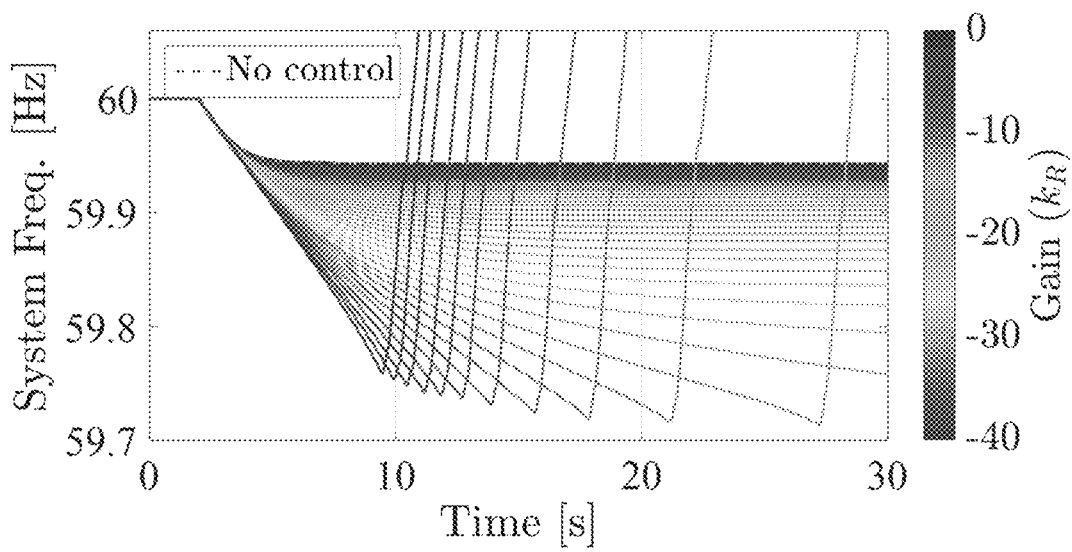
FIG. 5(b) is a similar graph, with communication enabled droop.
Figure 6:
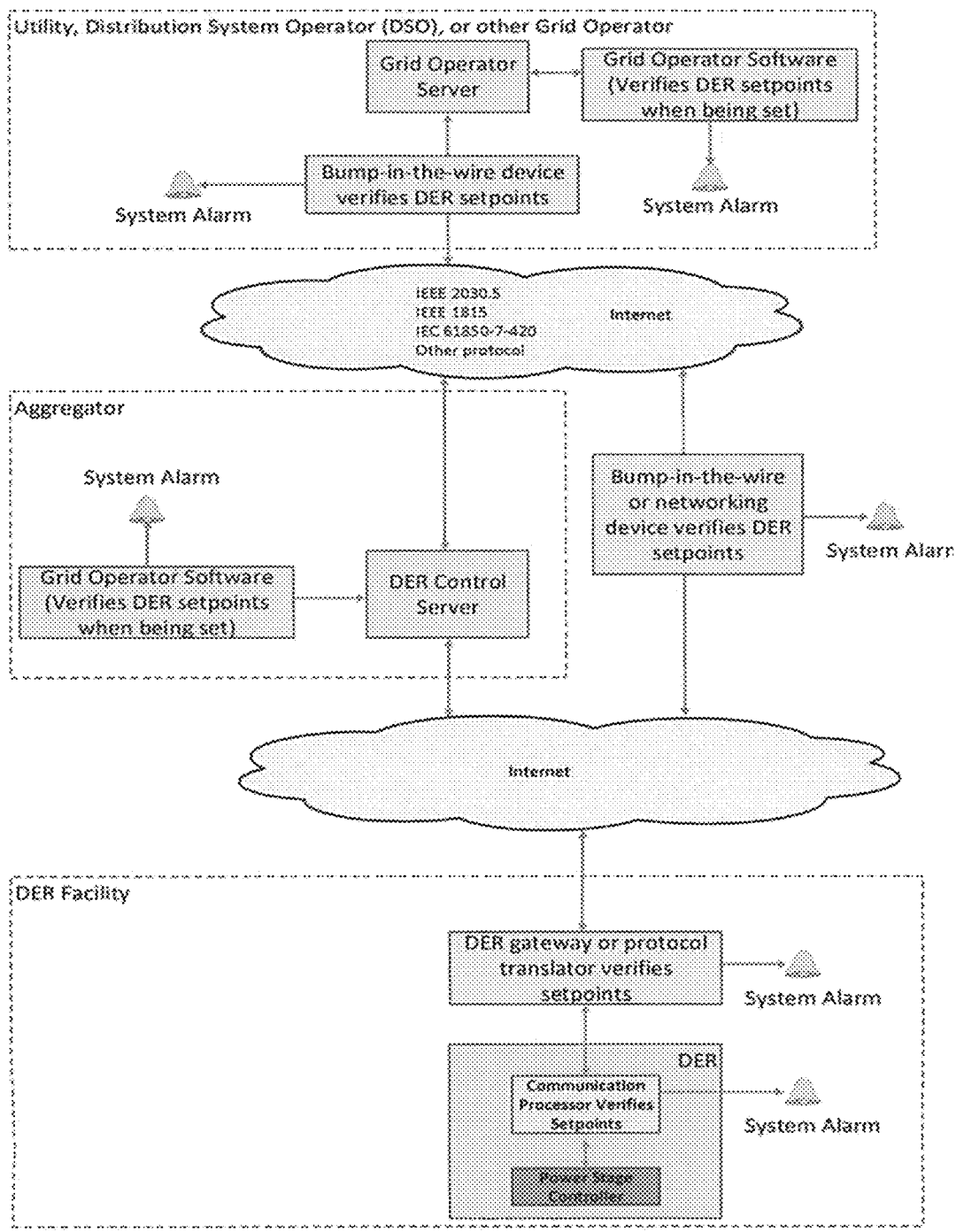
FIG. 6 illustrates a communication control system for a DER device according to various embodiments of the disclosure.

FIG. 6 illustrates a communication control system for a DER device according to various embodiments of the disclosure. As can be seen in FIG. 6, various cybersecurity intrusion detection systems (IDSs) can be placed or established at various locations in the DER communications network. Those IDSs would not only block the dangerous communications traffic to the DER equipment but may also be connected to alarms that notify operators or communicate the risk to the power system or to other computer systems to autonomously take action. The operators that may be notified include grid operators, DER owners, aggregators, local or national security operations centers (SOCs) at these companies or organizations like the Electricity Information Sharing and Analysis Center (E-ISAC) that coordinate cybersecurity incident response actions. It is also possible to connect alarms to computer systems that could lock the user out of the system for a period of time, isolate the computer of system issuing the malicious command, or otherwise prevent additional actions by the originator of the command. One of the primary benefits of this technology is that insider threat actions can be detected and mitigated. The IDS can also detect when grid operators or other networked organizations or individuals make mistakes in DER programming and prevent those actions from reaching the DER equipment.

Power System Risks from DER Grid-Support Functions

Based on the power system studies described above and knowledge DER control behaviors, the estimated aggregated control risk from each DER function is presented in Table 1. The risk presented due to improper programming of the grid-support function is evaluated using the following criteria:

Low risk: limited power system impact
Medium risk: regional voltage effects or localized loss of load (brownouts)
High risk: bulks system power outages Functions which adjust the DER active power could result in blackout situations, if the lost power generation, for example lost solar generation, occurs quickly and was providing power greater than the contingency reserves. In those cases, the risk is high. The functions which adjust reactive power are medium risk to the power system because these could cause localized high or low voltage issues or trip off some DER devices, as described in the section titled Distribution Cases. However, if the DER penetrations are high enough, the risk will increase because large portions of the grid will be disconnected.

TABLE 1

Anticipated power system risk from adversary control of DER aggregations, assessed for each grid-support function.

| Grid-support function | Risk | Cause | Risk with Controls | Mitigation Plan |
|---|---|---|---|---|
| Frequency Ride-Through (FRT) Trip Settings | High | Tight FRT trip settings cause DER power loss with minor frequency deviations | Low | Enforce IEEE 1547, CA Rule 21, HI Rule 14 or other standards' ranges of adjustability for each must-trip point will prevent the DER from prematurely tripping |
| Voltage Ride-Through (VRT) Trip Settings | High | Tight VRT trip settings cause DER power loss from minor voltage deviations | Low | Enforce IEEE 1547, CA Rule 21, HI Rule 14 or other standards' ranges of adjustability for each must-trip point will prevent the DER from prematurely tripping. |
| Normal Ramp Rate (RR) | Low | Fast RR requires faster regulation but minimal power system impact | Low | Set maximum ramp rate to reduce frequency regulation requirements |
| Soft-Start Ramp Rate (SS) | Low | Fast SS requires faster down-regulation but minimal power system impact | Low | Set maximum SS to prevent frequency overshoot during black start |
| Frequency-Watt (FW) | High | Improperly programmed FW curves cause DER power loss, possibly resulting in a blackout | Low | Requiring parameter and deadband constraints will prevent DER power reductions. |
| Voltage-Watt (VW) | High | Improperly programmed VW curves cause DER power loss, possibly resulting in a blackout | Low | Requiring parameter and deadband constraints will prevent DER power reductions. |
| Connect or Disconnect (INV1) | High | Aggregate DER power loss could cause blackout | High | None. Requiring a randomization time window could prevent step changes in production. |
| Limit Max Real Power (INV2) | High | Aggregate DER power loss could cause blackout | High | None. Only limits on settling time or ramp rate would prevent under-generation. |
| Power Factor (INV3) | Medium | Extreme voltage conditions, DER will trip on VRT trip settings, possibly leading to outages* | Medium | None. Applying ramp rates would slow the control action so other voltage regulation equipment could react. |
| Volt-Var mode (VV) | Medium | Extreme voltage conditions, DER will trip on VRT trip settings, possibly leading to outages* | Low | Requiring the reactive power sign to provide negative feedback to the voltage deviation will prevent voltage excursions. |
| Watt-Power Factor (WP) | Medium | Extreme voltage conditions, DER will trip on VRT trip settings, possibly leading to outages* | Low | Constraining the W-PF curve will prevent voltage excursions. |
| Fixed Reactive Power | Medium | Extreme voltage conditions, DER will trip on VRT trip settings, possibly leading to outages* | Medium | None. Applying ramp rates would slow the control action so other voltage regulation equipment could react. |

*These scenarios are difficult to predict. DER will trip on overvoltage, thereby mitigating some of the voltage issues. Current-based protection systems will not isolate portions of the feeder. However, if enough distributed generation is tripped in high penetration environments (e.g., HI), bulk system impacts could occur.

Engineering Controls

The present inventions provide an engineered control method to reduce the risk presented by interoperable DER equipment with grid-support functions. As shown previously, power system quality of service can be impacted by improperly set grid-support parameters, so software or hard-coded firmware rules can be implemented in the DER, utility, DER aggregator, or DER control network that reject the grid-support settings if they fall outside of an allowable range. These engineering control rules can largely prevent PV systems from causing adverse power system effects through adversary actions or accidental misconfiguration. For each of the advanced grid-support functions (e.g., volt-var, freq-watt, specified power factor, etc.), the parameters that define these functions can be checked against simple mathematical rules and be required to fall within safe operating regions for the particular power system. When parameters are set outside of these limits, the verification system, communication module, or inverter microprocessor can verify the setting and reject the update if necessary. Ranges of values or mathematical rules for each of the parameters in the information models (e.g., Common Smart Inverter Profile (CSIP): IEEE 2030.5 Implementation Guide for Smart Inverters, AN2018-001 DNP3 Application Note, SunSpec Modbus Models, IEC 61850) would be established based on the particular power system the DER equipment was interconnected. Theoretical cyber attacks, as described below, can determine parameter constraints for grid-support functions to minimize the risk of adversary manipulation.

FRT and VRT: Frequency and voltage ride-though and trip requirements determine when the DER will cease to energize (often called gate blocking) and disconnect from the power system. IEEE 1547a, IEEE 1547 full revision, Rule 21, and Rule 14 have default values and ranges of adjustability for these parameters. There is variability in the power system voltage and frequency naturally. These variations are typically small and occur as the load and generation mix changes on the power system. One risk of this function is that if the voltage or frequency magnitude were adjusted to commonly occurring levels (such as nominal frequency or voltage), the FRT and VRT function would disconnect the DER. Simple rules to limit the trip settings ranges of adjustment can prevent this type of attack.

RR and SS: Normal and soft start ramp rates determine the maximum change in active power of the DER during normal operation and start-up. In general, these functions are unlikely to be configured in a manner to cause power system disturbances. One potential exception is a case where there is a disruption to the bulk system and all inverters are disconnected from the system. When the system re-energizes, if the inverters all start exporting power after the reconnection delay (typically 5 minutes) with a high soft start ramp rate, it could cause a high frequency event. To avoid this risk, maximum ramp rates can be established, as they have been in CA Rule 21, and enforced in the DER when they are issued a command.

FW: Frequency-watt functions provide grid stability during over-frequency events (or under-frequency events). See J. Johnson et al., "Photovoltaic Frequency-Watt Curve Design for Frequency Regulation and Fast Contingency Reserves," IEEE JPV, vol. 6, no. 6, pp. 1611-1618, November 2016. However, if these functions are programmed with no deadband and steep slope, the DER would rapidly change its output with minor over- or under-frequency events. Since frequency is system-wide, there would be a high correlation of power changes between DER, which could lead to bulk system effects such as a blackout.

Figure 7:
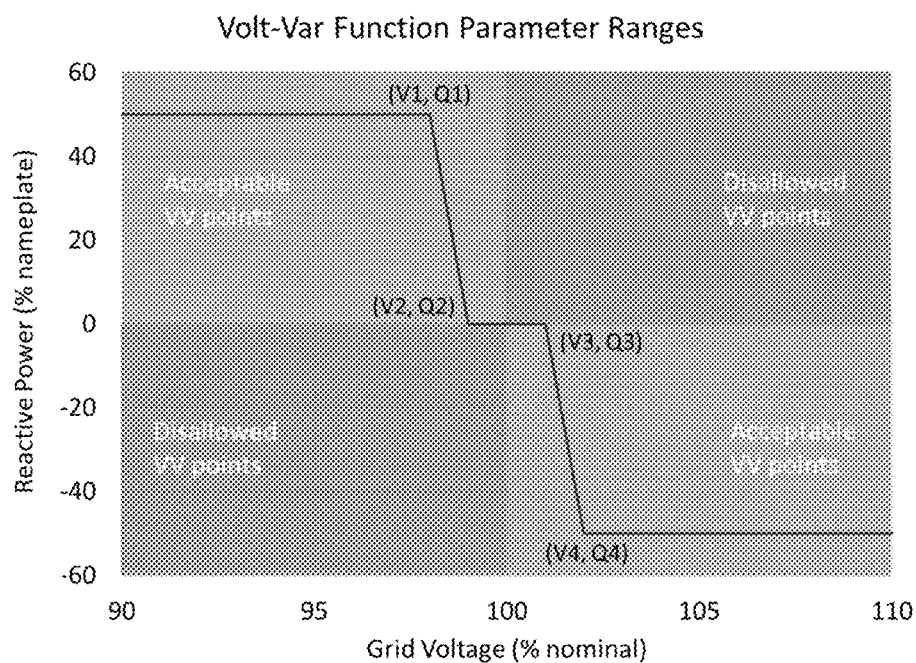
FIG. 7 illustrates example engineering control rules for VV curve parameters.

VV: The volt-var pointwise curves are defined by (V, Q) points. To prevent the type of attack presented earlier, rules can be enforced to ensure the points assigned to be in Q2 and Q4 in the V-Q plane and rejected otherwise (i.e., points assigned to be in Q1 and Q3 would be rejected), as shown in FIG. 7.

VW: The volt-watt function is designed to reduce the active power during high voltage events. The same risks that exist for the FW function exist with the VW function. If the function is programmed such that nominal voltages generate zero power, this function would produce the same effect as a disconnect command. To protect against this type of attack, required deadband sizes and nominal production values can be instigated.

PF: As described above, the fixed power factor function can be manipulated to increase the local grid voltage. It is unlikely any engineering controls can be placed on this function for general operations, however for the case of reducing voltage as active power increases, the power factor can be limited to the reactive power absorption quadrant (Q4).

Figure 8:
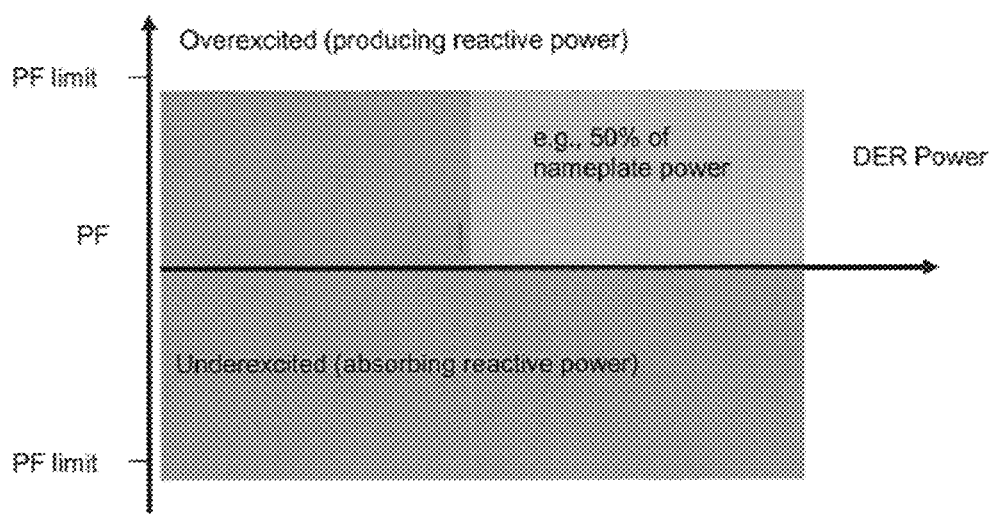
FIG. 8 illustrates engineering control to minimize WP overvoltages due to misprogramming.

WP: The watt-power factor risks are the same as those from the fixed power factor function because a horizontal line can be programmed so that regardless of the DER power production, the DER operates at a fixed PF. Since this function has a relatively limited use case, a region can be blocked off, as shown in FIG. 8, where the DER cannot produce reactive power above a set active power output level. This reduces the risk presented in section above titled "Fixed power factor" where the DER PF drove the point of common coupling (PCC) voltage even higher. It is unlikely that there would be a use case for this function where the DER would source reactive power at high DER power.

Fixed Reactive Power: A fixed reactive power function presents nearly the same risks as a fixed power factor function, except the reactive power is not reduced at low DER power. Depending on the use case, any number of reactive power levels can be used, so there is no engineering control to minimize the power system risk from this function.

The present invention has been described as methods to mitigate cyber attacks on power systems comprising distributed energy resources. It will be understood that the above description is merely illustrative of the applications of the principles of the present invention, the scope of which is to be determined by the claims viewed in light of the specification. Other variants and modifications of the invention will be apparent to those of skill in the art.

I claim:

1. A detection and mitigation system for a distributed energy system comprising distributed energy resources (DER), comprising:
    an engineered control located at communication network nodes between DER and a DER management system (DERMS) or power system controller, the engineered control system comprising at least one or more processors coupled to a memory storing instructions configured to detect and reject an unsafe grid-support function command for the DER that falls out of a predetermined allowable range;
    wherein the engineered control system detects and rejects unsafe the grid-supported function command with an intrusion detection system (IDS) or intrusion prevention system (IPS) that executes steps comprising:

establishing a set of allowable ranges for grid support settings for the DER;

comparing a grid support setting from a DER command to a corresponding established range for that grid-support setting;

determining in response to the grid support setting is outside the established range for that grid-support setting; and preventing the DER from executing the DER command in response to the grid support setting is outside the established range for that grid-support setting;

wherein the unsafe grid-support support function command is selected from a group consisting of IEEE Std. 1547-2018 functions, frequency ride-through, voltage ride-through trip settings, normal ramp rate, soft-start ramp rate, frequency-watt, voltage-watt, connect or disconnect, limit maximum real power, power factor, volt-var mode, watt-power factor, and fixed reactive power.

2. The system of claim 1, further comprising an alarm that indicates when an unsafe grid-support function command is received at the engineered control system.

3. The system of claim 1, wherein the engineered control system is disposed in a communications pathway of the distributed energy system.

4. The system of claim 3, wherein the communications pathway is an internet communications pathway.

5. The system of claim 1, wherein the engineered control system is disposed in DER equipment, a communication gateway at a DER facility, a bump-in-the-wire or networking device, a DER vendor, aggregator, or owner/operator control or networking system, or a firewall, a utility firewall or networking systems, or a utility control software.

6. The system of claim 1, wherein the engineered control system is a component of a controller.

7. The system of claim 6, wherein the controller is a DER controller.

8. The system of claim 1, wherein the engineered control system is configured to take a corrective action upon determining a false command.

9. The system of claim 8, wherein the corrective action is selected from the group consisting of dropping the command from the DER, resetting the DER or a collection of DERs operating modes to a known safe configuration, prevent further communications to the DER or the collection on DERs for a period of time, revoke credentials of an operator who issued the unsafe command, or reconfigure DER communication system.

10. The system of claim 1, wherein the engineered control system comprises software or firmware verification or validation.

* * * * *